US011756372B2

(12) United States Patent
Imura

(10) Patent No.: US 11,756,372 B2
(45) Date of Patent: Sep. 12, 2023

(54) CASINO GAME MEDIUM AND GAME TABLE SYSTEM

(71) Applicant: Universal Entertainment Corporation, Tokyo (JP)

(72) Inventor: Hideaki Imura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 45 days.

(21) Appl. No.: 17/303,572

(22) Filed: Jun. 2, 2021

(65) Prior Publication Data

US 2021/0383638 A1 Dec. 9, 2021

(30) Foreign Application Priority Data

Jun. 4, 2020 (JP) ................................ 2020-097951

(51) Int. Cl.
*G06K 7/10* (2006.01)
*G07F 17/32* (2006.01)
*G06K 19/077* (2006.01)

(52) U.S. Cl.
CPC ....... *G07F 17/322* (2013.01); *G06K 7/10366* (2013.01); *G06K 19/07773* (2013.01); *G07F 17/3248* (2013.01)

(58) Field of Classification Search
CPC .............. G07F 17/322; G07F 17/3248; G06K 7/10366; G06K 19/07773
USPC ........................................ 235/492, 375, 451
See application file for complete search history.

(56) References Cited

U.S. PATENT DOCUMENTS

| 2008/0076536 | A1* | 3/2008 | Shayesteh | G07D 7/01 |
| | | | | 463/25 |
| 2009/0146373 | A1* | 6/2009 | Chapet | A44C 21/00 |
| | | | | 463/47 |
| 2015/0015042 | A1 | 1/2015 | Willingham | |

* cited by examiner

*Primary Examiner* — Jamara A Franklin
(74) *Attorney, Agent, or Firm* — Simpson & Simpson, PLLC; S. Peter Konzel

(57) ABSTRACT

Provided is a casino game medium and a game table system capable of reducing adjacent reading without limiting a design of a game table. The casino game medium 100 includes the medium side antenna 110, the resistance element 111 connected to the medium side antenna 110, and the IC chip 112 that stores medium information and outputs the medium information based upon an induced electromotive force generated in the medium side antenna 110. The medium side antenna 110 is designed so that the resonance frequency thereof is higher than the specified frequency band.

7 Claims, 6 Drawing Sheets

FIG.5

CASINO GAME MEDIUM AND GAME TABLE SYSTEM

CROSS-REFERENCE TO RELATED APPLICATION

This application claims the benefit of Japanese Pat. App. No. 2020-097951, filed Jun. 4, 2020, which application is incorporated herein by reference in its entirety.

FIELD OF THE INVENTION

The present invention relates generally to a casino game medium and a game table system.

BACKGROUND OF THE INVENTION

In a related art, in a casino, a game medium such as a chip, a plaque, or the like is used as a bet and a dividend in a table game. In recent years, it is known that an RFID that stores information on a game medium is built into such a game medium. Such a casino game medium includes an IC for storing game medium information such as a game value or the like and a medium side antenna including a coil and a capacitor inside a substrate insert-molded into a flat plate shape with resin. Such a casino game medium generates an induced electromotive force from a magnetic field generated by a reader and writer provided in a game table, and transmits the medium information to the reader and writer by the induced electromotive force. For example, a frequency band of a radio wave used for the RFID is specified as a short-wave band (13.56 MHz) or the like, and the medium side antenna is designed so that a resonance frequency thereof becomes a frequency of the short-wave band, thereby obtaining communication stability.

Meanwhile, such a casino game medium is generally disposed to be stacked on the game table in which the reader and writer is provided by a dealer who plays the table game, a participant of the table game, or the like. Therefore, the above-described reader and writer is required to respectively and accurately read the medium information of a plurality of casino game media stacked thereon. However, when the medium information thereof is read in a state where the casino game media are stacked, mutual inductance between a plurality of medium side antennas may cause deterioration in each resonance frequency, such that communication with the reader and writer may become difficult.

For example, in US Published Patent Application No. 2015/0115042, the medium side antenna is configured to include a main arrangement pattern provided along a closed curve and a plurality of sub arrangement patterns of which respective diameters are smaller than a diameter of the main arrangement pattern. As a result, it is possible to reduce a possibility of occurrence of electromagnetic mutual interference between the respective medium side antennas of the stacked casino game media, and to perform communication between the casino game medium and the reader and writer even when the plurality of casino game media are stacked.

BRIEF SUMMARY OF THE INVENTION

Meanwhile, it is known that a magnetic field generated by a reader and writer spreads according to a distance from the reader and writer. Therefore, it is required to widen the distance between reader and writers in order to prevent communication with other reader and writers (so-called adjacent reading) when casino game media are disposed to be stacked, such that there is a problem that a design of a game table provided with the reader and writer is limited.

An object of the present invention is to provide a casino game medium and a game table system capable of reducing adjacent reading without limiting a design of a game table.

A casino game medium of the present invention includes:
a medium side antenna;
a resistance element connected to the medium side antenna; and
an IC chip that stores medium information and outputs the medium information based upon an induced electromotive force generated in the medium side antenna.

Generally, in a medium side antenna of a related art, an LC circuit is designed so that a resonance frequency thereof is in a specified frequency band, and a Q (quality factor) value specified by $1/R\sqrt{(L/C)}$ is raised as high as possible, thereby reducing loss and improving operation efficiency in the specified frequency band. In the casino game medium of the present invention, the resistance element that is not normally provided is connected to the medium side antenna. As a result, a resistance value of the resistance element connected to the medium side antenna can lower the Q value without affecting the resonance frequency of the medium side antenna, and the Q value is intentionally lowered to reduce sensitivity, such that adjustment can be performed to the extent that adjacent reading is not performed at a game table to be actually operated.

In the casino game medium of the present invention, the medium side antenna may be designed so that a resonance frequency thereof is higher than a specified frequency band.

According to the above-described configuration, the resonance frequency of the medium side antenna is raised to be higher than the specified frequency band in advance without causing the medium side antenna to be formed with a complicated configuration of a related art, thereby making it possible to improve a possibility that the casino game medium falls within an operable range even though the resonance frequencies of a plurality of stacked medium side antennas deteriorate.

In the casino game medium of the present invention,
the medium side antenna, the resistance element, and the IC chip may be provided on a printed circuit board (PCB), and
the resistance element may be separated from the IC chip on the PCB, and may be disposed outside an area of a spiral pattern serving as a coil of the medium side antenna.

According to the above-described configuration, the resistance element is separated from the IC chip and disposed outside the area of the spiral pattern forming the coil of the medium side antenna. As a result, when the resistance element is adjusted to set the resistance value for preventing the adjacent reading, it is possible to reduce an influence on the medium side antenna of which resonance frequency is already set and arrangement is determined and the IC chip. As a result, the resistance value of the resistance element may be set at a final stage, and a design accompanied by a change of the resistance element can be facilitated.

In the casino game medium of the present invention, a resistance value of the resistance element may be variable.

According to the above-described configuration, it becomes easy to find the resistance value of the resistance element at which the adjacent reading is not performed according to a design of a reading side such as the game table or the like.

A game table system of the present invention is a game table system including a game table that reads medium information in a casino game medium, where the casino game medium includes
a medium side antenna,
a resistance element connected to the medium side antenna, and
an IC chip that stores the medium information and outputs the medium information based upon an induced electromotive force generated in the medium side antenna, and
the game table is provided with a reader and writer that outputs an oscillation signal of a frequency in a specified frequency band below each of a plurality of chip arrangement areas where the casino game medium is disposed.

According to the above-described configuration, the casino game medium of the present invention is designed so that a resonance frequency of the medium side antenna is higher than a specified frequency band, and the resistance element, which is not normally provided, is connected to the medium side antenna. As a result, a resistance value of the resistance element connected to the medium side antenna can lower a Q value without affecting the resonance frequency of the medium side antenna, and the Q value is intentionally lowered to reduce sensitivity, such that adjustment can be performed to the extent that the reader and writer does not perform adjacent reading on the casino game media stacked on another reader and writer at a game table to be actually operated.

In the game table system of the present invention, where
a resistance value of the resistance element may be set to a value at which each IC chip of the predetermined number of casino game media stacked on one reader and writer at the game table is not driven by a magnetic field based upon an oscillation signal outputted by a reader and writer adjacent to the one reader and writer.

In general, a related-art game table is required to design the reader and writers to be separated from each other to the extent that the adjacent reading is not performed on the casino game medium, but according to the above-described configuration, the resistance value can be adjusted later to a resistance value at which the adjacent reading is not performed at the game table that actually uses the casino game medium. As a result, the casino game medium does not limit a design of the game table, such that a degree of freedom of the design of the game table can be expanded.

In the game table system of the present invention, where
the medium side antenna may be designed so that a resonance frequency thereof is higher than the specified frequency band.

According to the above-described configuration, the resonance frequency of the medium side antenna is raised to be higher than the specified frequency band in advance without causing the medium side antenna to be formed with a complicated configuration of a related art, thereby making it possible to improve a possibility that the casino game medium falls within an operable range even though the resonance frequencies of a plurality of stacked medium side antennas deteriorate.

BRIEF DESCRIPTION OF THE DRAWINGS

The nature and mode of operation of the present invention will now be more fully described in the following detailed description of the invention taken with the accompanying drawing figures, in which:

FIG. 5 is an explanatory diagram illustrating an example of a display mode of a dealer display.

DETAILED DESCRIPTION OF THE PREFERRED EMBODIMENT

Hereinafter, the present invention will be described with reference to the drawings.

Figure 1:
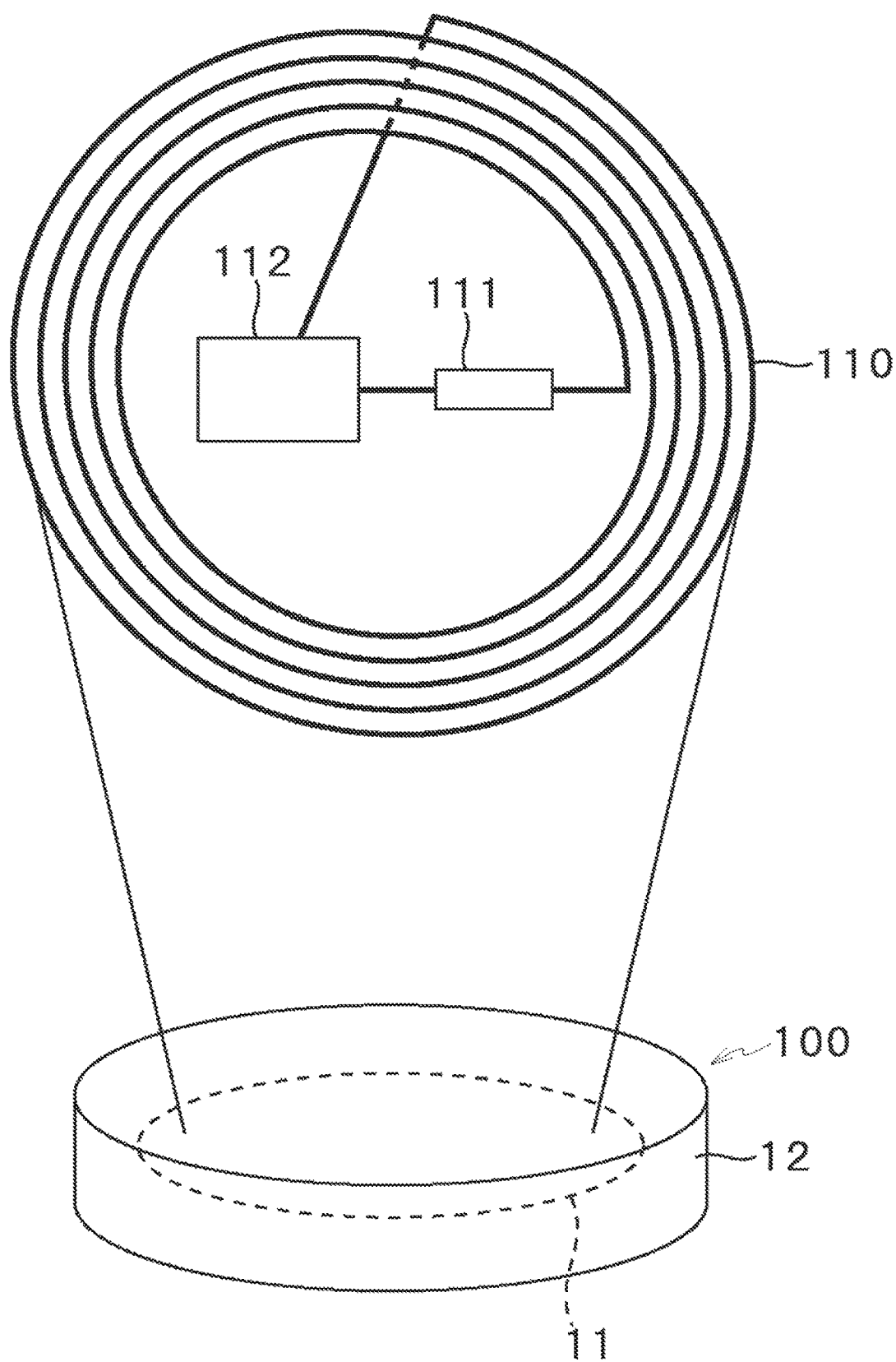
FIG. 1 is an explanatory diagram illustrating a structure of a casino game medium.

As illustrated in FIG. 1, a casino game medium 100 of the embodiment includes a printed circuit board (PCB) 11 and a housing body 12 that houses the PCB 11 inside and forms an outer shape of the casino game medium 100.

A type (attribute) of the casino game medium 100 includes a chip, a token, a plaque, or the like, and corresponds to a configuration in which currency information and a game value of a game point are provided in electronic data and an outer surface form, and the game value thereof can be read from the outside. The outer surface form is a form that can be identified from the outside such as a color, a pattern, a character, an image, a shape, or the like. In the embodiment, a casino chip is described as an example of the casino game medium, and the casino game medium is not limited thereto as long as the casino game medium is a game medium that can be used in a casino.

The PCB 11 includes a medium side antenna 110, a resistance element 111, and an IC chip 112. The PCB 11 is formed by soldering the resistance element 111 and the IC chip 112 to a printed wiring board (PWB) on which a wiring pattern of the medium side antenna 110 is applied in advance. The medium side antenna 110 is formed in a spiral pattern, and the resistance element 111 and the IC chip 112 are connected in series between both ends thereof. The casino game medium 100 is formed by insert shaping so that resin is applied around a periphery of the PCB 11. In the embodiment, a single spiral pattern is applied as the wiring pattern of the medium side antenna 110, and the wiring pattern thereof is not limited thereto.

In the embodiment, the casino game medium 100 is an RFID tag used in a passive type short-wave band (13.56 MHz), and a system and a frequency band are not limited thereto. A resonance frequency of the medium side antenna 110 is set to be higher than the short-wave band (13.56 MHz). A setting value of the resonance frequency of the medium side antenna 110 varies depending on a thickness of the housing body 12 of the casino game medium 100 and the desired number of stacked casino game media 100. That is, for each number from one casino game medium 100 to the desired specific number (for example, nine), it is performed whether reading can be performed by a reader and writer oscillating in a specified frequency band. Next, a resonance frequency successfully read in all cases is applied to the resonance frequency of the medium side antenna 110. A well-known method for applying the resonance frequency can be adopted.

The resistance element 111 is a general-purpose electronic component, and is used to obtain a constant electric resistance value and to lower a Q value. In the embodiment, the resistance element 111 is connected to the medium side antenna 110 in series, and as the resistance value is higher, the Q value is lower, but the present invention is not limited thereto. For example, the resistance element 111 may be connected to the medium side antenna 110 in parallel, and here, as the resistance value is lower, the Q value is lower.

The IC chip 112 is a general-purpose electronic module, and a function thereof is not particularly limited. For example, the IC chip 112 may include a storage unit that can store various data such as individual information (ID), a face value, an owner, a distribution history, or the like of the casino game medium 100. That is, various data such as value data or the like of the casino game medium are stored in the storage unit (memory area) of the IC chip 112 so that various data can be transmitted to an external server.

As such, the casino game medium 100 includes the medium side antenna 110, the resistance element 111 connected to the medium side antenna 110, and the IC chip 112 that stores medium information and outputs the medium information based upon an induced electromotive force generated in the medium side antenna 110.

According to the above-described configuration, the medium side antenna 110 is designed so that the resonance frequency thereof is higher than the specified frequency band, and the resistance element 111 which is not normally provided is connected to the medium side antenna 110. As a result, the resistance value of the resistance element 111 connected to the medium side antenna 110 can lower the Q value without affecting the resonance frequency of the medium side antenna 110, and by intentionally lowering the Q value to reduce sensitivity, adjustment can be performed to the extent that adjacent reading is not performed at a game table to be actually operated.

The medium side antenna 110 is designed so that the resonance frequency thereof is higher than the specified frequency band. As a result, the resonance frequency of the medium side antenna 110 is raised to be higher than the specified frequency band in advance without the medium side antenna 110 having a complicated configuration of a related art, thereby making it possible to improve a possibility that the casino game medium 100 falls within an operable range even though the resonance frequencies of the plurality of stacked medium side antennas 110 deteriorate.

As illustrated in FIG. 1, the resistance element 111 is disposed at a position separated from the IC chip 112 on the PCB 11. The resistance element 111 is disposed outside an area of the spiral pattern serving as a coil of the medium side antenna 110. As a result, when the resistance element 111 is adjusted to set the resistance value for preventing the adjacent reading, it is possible to reduce an influence on the medium side antenna 110 of which resonance frequency is already set and arrangement is determined and the IC chip 112. As a result, the resistance value of the resistance element 111 may be set at a final stage, and a design accompanied by a change of the resistance element 111 can be facilitated.

Next, a game table system 1 including a game table 2 that reads the medium information stored in the casino game medium 100 will be described.

Figure 2:
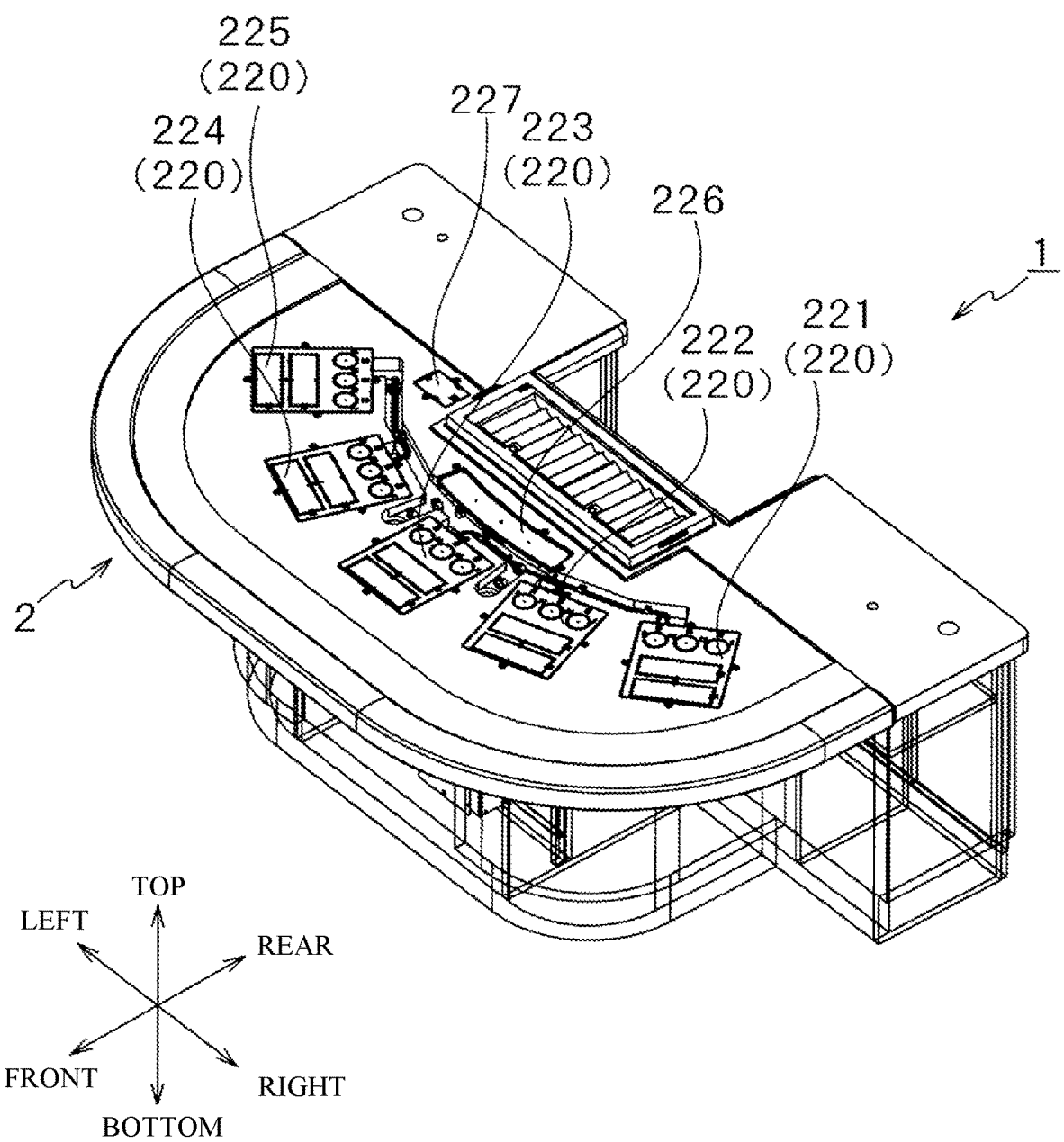
FIG. 2 is a perspective view of a game table system.

As illustrated in FIG. 2, the game table system 1 is configured to be able to read the medium information stored in the IC chip 112 of the casino game medium 100 disposed on the game table 2 when a participant of a game bets. A detachable game board (not illustrated) is provided on the game table 2. A bet area where the casino game medium 100 with which the participant bets is disposed, a dealer area where the casino game medium 100 owned by a dealer is disposed, a commission area for paying commission of the game, or the like are provided (not illustrated) on the game board. Five antenna modules 220 (antenna modules 221, 222, 223, 224, and 225), an antenna 226, and an antenna 227 serving as a reader and writer for reading the casino game medium 100 disposed in each of the above-described areas are embedded at positions corresponding to the respective areas under the game board. Although not illustrated, antennas 2201 to 2205, the antenna 226, and the antenna 227 are connected to a control unit via a coupler board.

For example, each of the five antenna modules 220 is configured as a unit including a plurality of antennas for reading a bet target area 2100 provided in each of bet areas 211, 212, 213, 214, and 215. All of the antenna modules 221, 222, 223, 224, and 225 are configured in the same manner, but are not limited thereto.

Figure 3:
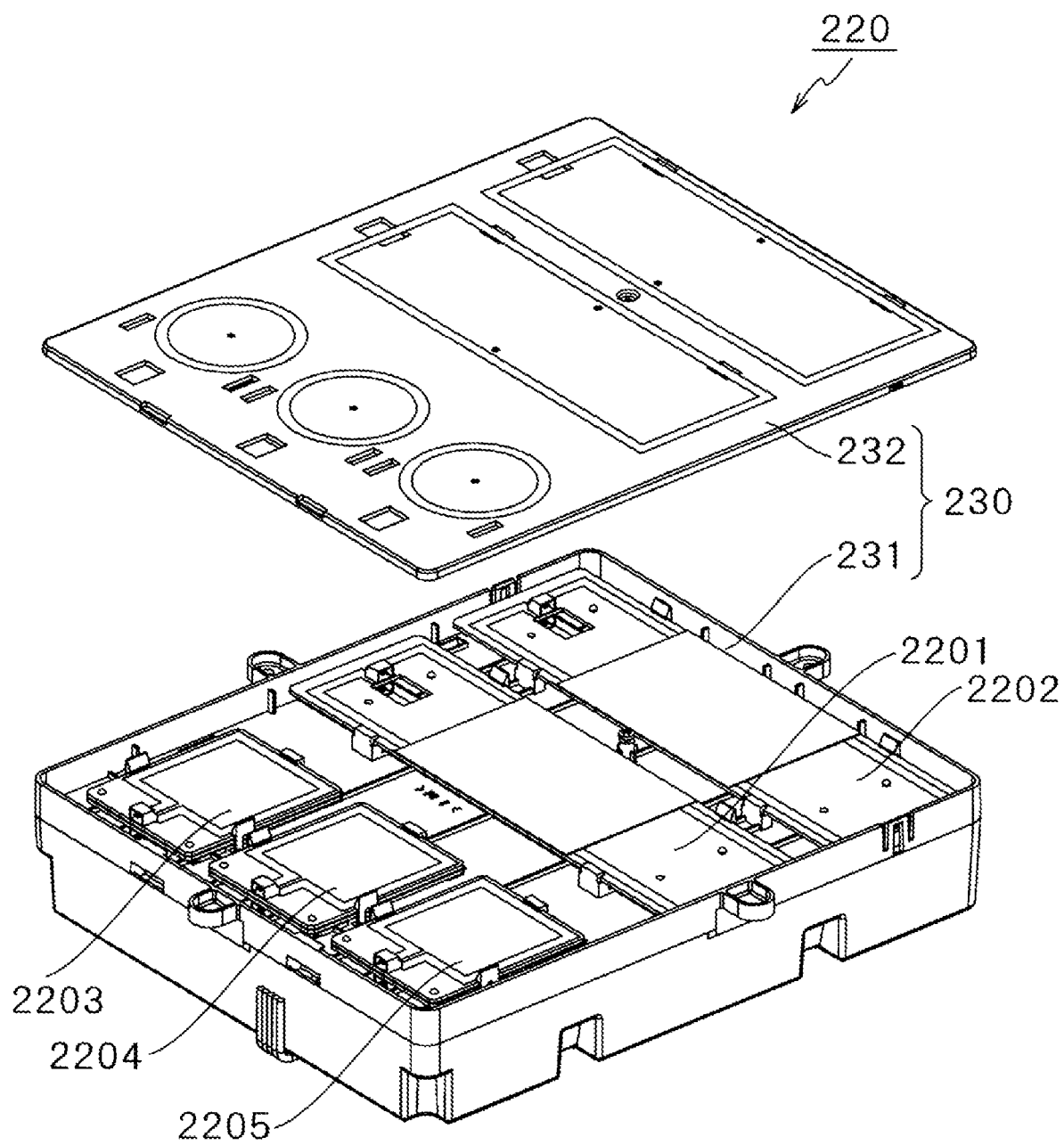
FIG. 3 is a partially exploded perspective view of an antenna module.

Specifically, as illustrated in FIG. 3, the antenna module 220 has an approximately rectangular parallelepiped shape. A housing body 230 of the antenna module 220 includes a main body portion 231 and a lid portion 232. The lid portion 232 is superimposed on an opened upper surface of the main body portion 231, thereby forming the housing body 230 of the antenna module 220 including an internal space.

The antenna module 220 of the embodiment is used for baccarat, and includes the antennas 2201, 2202, 2203, 2204, and 2205 for respectively reading the casino game medium 100 disposed in each area for each bet target (player, bunker, player pair, tie, and bunker pair) in the internal space of the housing body 230. The antennas 2201, 2202, 2203, 2204, and 2205 respectively output an oscillation signal in a specified frequency band by power supplied from the antenna module 220, and generate an induced electromotive force in the medium side antenna 110 disposed on the casino game medium 100 by electromagnetic induction by the oscillation signal. Next, the casino game medium 100 drives the IC chip 112 by the induced electromotive force and transmits the medium information stored therein to the corresponding antenna.

Figure 4:
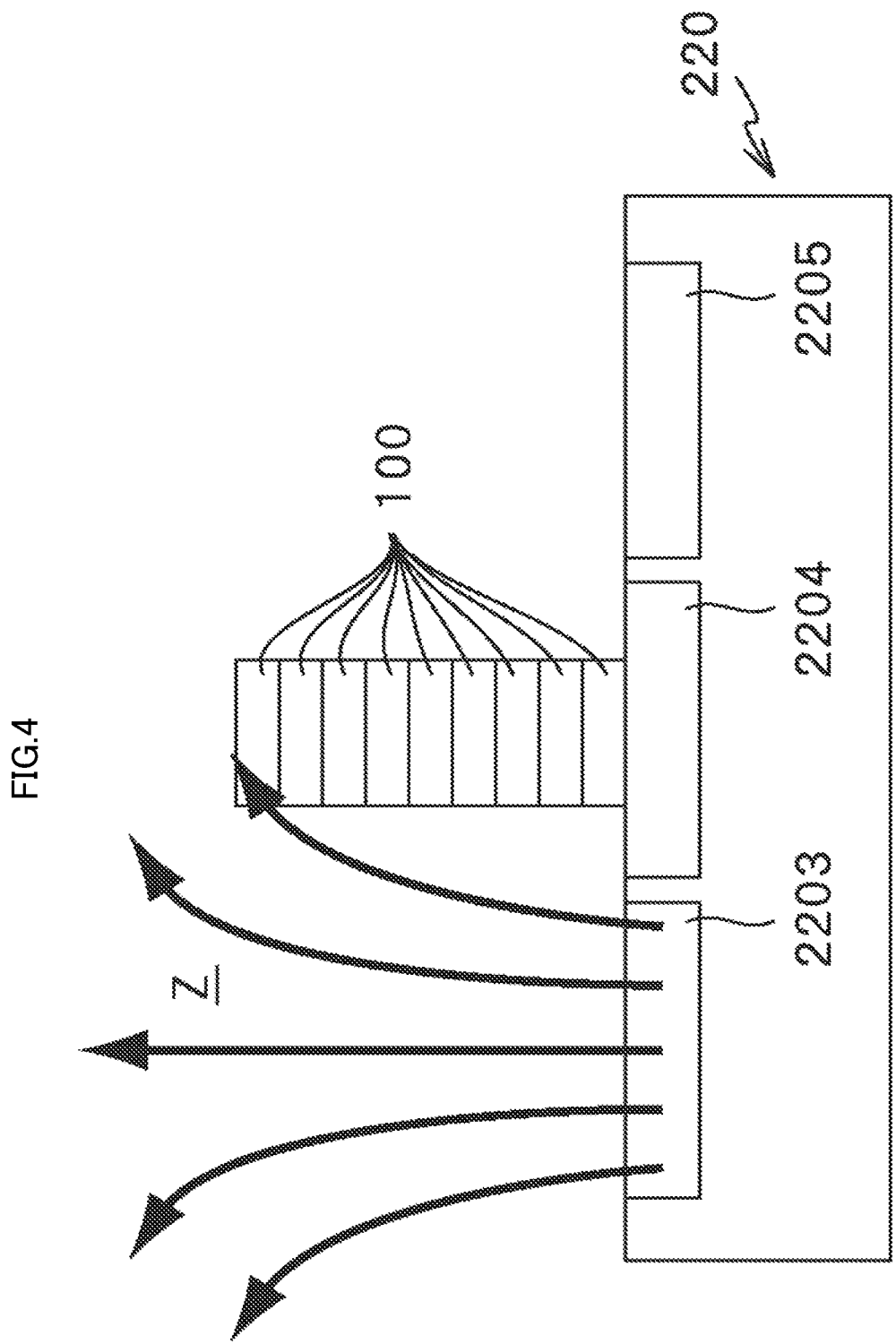
FIG. 4 is an explanatory diagram illustrating an influence of a magnetic field of an adjacent antenna with respect to the stacked casino game media.

As illustrated in FIG. 4, the antennas 2203, 2204, and 2205 that read the bet area of the player pair, the tie, and the bunker pair are close to each other, and, for example, when the antenna 2203 is driven, a generated magnetic field Z becomes wider as the generated magnetic field Z goes upward. Therefore, there is a possibility that the medium side antenna 110 of the casino game medium 100 stacked on the antenna 2204 is affected, and the induced electromotive force sufficient enough to drive the IC chip 112 is generated. Therefore, in the casino game medium 100 of the embodiment, sensitivity with respect to the magnetic field Z is lowered by connecting the resistance element 111 to the medium side antenna 110 and lowering the Q value.

The resistance value of the resistance element 111 provided in the casino game medium 100 is determined by being tried in the game table system 1 actually using the casino game medium 100. That is, the resistance element 111 provided in the casino game medium 100 is used as a variable resistance, and as illustrated in FIG. 4, the desired number of casino game media 100 is stacked on a predetermined antenna (for example, antenna 2204). It is desirable that the number thereof is determined so that at least the antenna module 220 can read the casino game medium 100. Next, an antenna (for example, antenna 2203) adjacent to the antenna on which the casino game medium 100 is disposed is driven to change the resistance value of the resistance element 111, a resistance value at which all of the stacked casino game media 100 are not read is determined, and a resistance element having the above-described resistance value is applied at the time of manufacturing. As described above, the resistance element 111 provided in the casino game medium 100 is set as the variable resistance capable of changing the resistance value, such that it becomes easy to find the resistance value of the resistance element at which the adjacent reading is not performed according to a design of a reading side such as the game table or the like.

Figure 5:
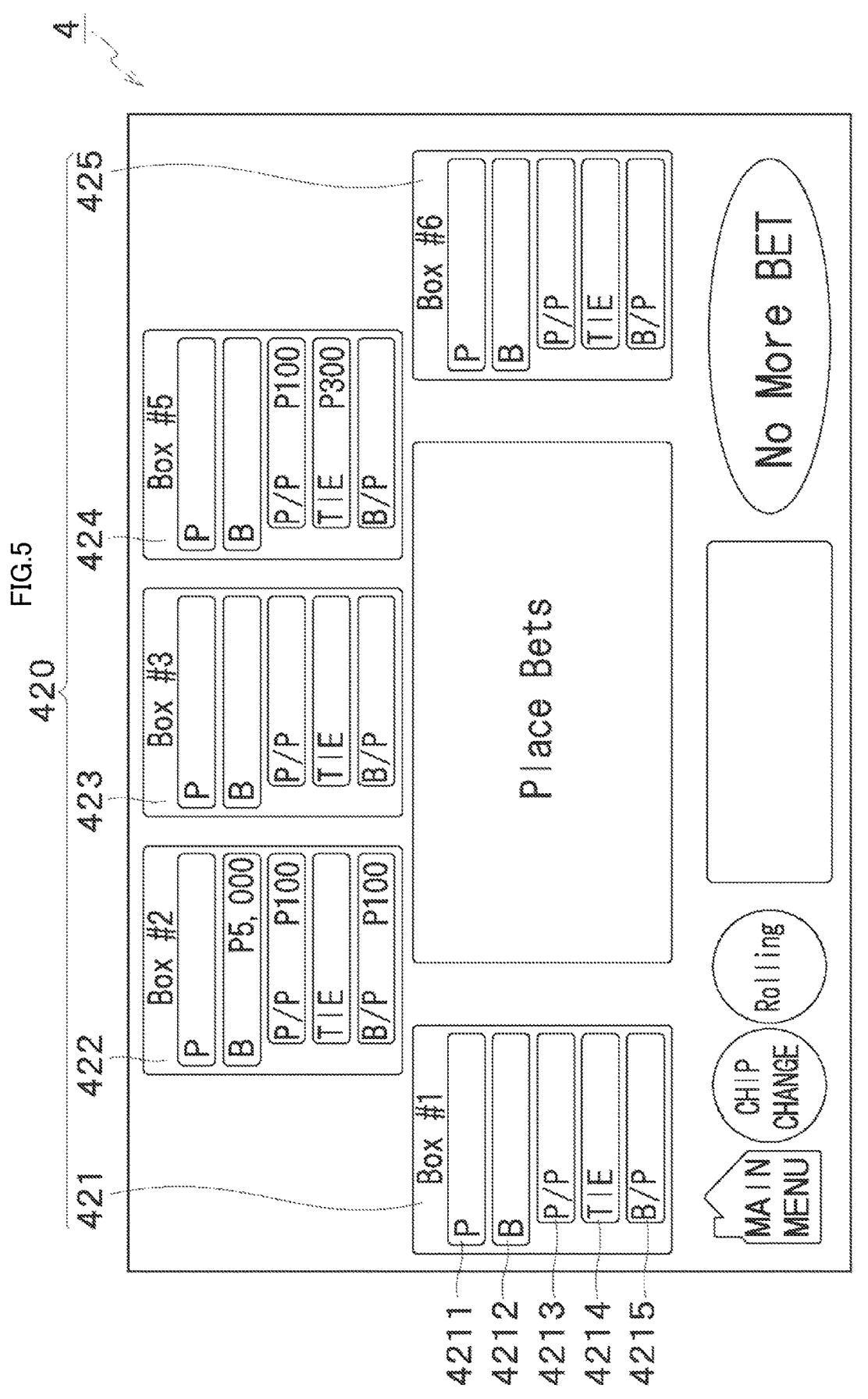

In the embodiment, as illustrated in FIG. 5, the game table system 1 includes a dealer display 4 for the dealer to perform confirmation, and the dealer display 4 displays the medium information of the casino game medium 100 read by each of the antennas 2201, 2202, 2203, 2204, and 2205.

Specifically, the dealer display 4 displays five bet display areas 421, 422, 423, 424, and 425 corresponding to the respective antenna modules 221, 222, 223, 224, and 225. Specifically, a bet display area 420 includes (bet display areas 421, 422, 423, 424, and 425 respectively include) a player bet display area 4211, a bunker bet display area 4212, a player pair bet display area 4213, a tie-bet display area 4214, and a bunker pair bet display area 4215. In the player bet display area 4211, a total value of valuable values of the casino game medium 100 being disposed on the antenna 2201 is displayed. In the bunker bet display area 4212, a total value of valuable values of the casino game medium 100 being disposed on the antenna 2202 is displayed. In the player pair bet display area 4213, a total value of valuable values of the casino game medium 100 being disposed on the antenna 2203 is displayed. In the tie-bet display area 4214, a total value of valuable values of the casino game medium 100 being disposed on the antenna 2204 is displayed. In the bunker pair bet display area 4215, a total value of valuable values of the casino game medium 100 being disposed on the antenna 2205 is displayed.

Therefore, in a trial stage of the resonance frequency and resistance value of the casino game medium 100, the desired number of casino game media 100 is stacked on the antenna 2204, and in a state where all the antennas 2201, 2202, 2203, 2204, and 2205 are driven, a state in which all the casino game media 100 can be read only by the antenna on which the casino game media 100 are disposed is tried.

For example, in the example of FIG. 5, when a total of 300 pesos of casino game media 100 are stacked only on the antenna 2204, a part (100 pesos) of the casino game media 100 is read by the antenna 2203. Therefore, it is required to reduce the Q value of the casino game media 100 and to adjust the resistance value of the resistance element so that the casino game media 100 are not read by the antenna 2203.

Although not illustrated, when all the casino game media 100 are not read by the antenna 2204, it is required to increase the resonance frequency of the medium side antenna 111 of the casino game medium 100 by adjusting the number of coil turns or the like within a range in which the casino game medium 100 can be read even when the casino game medium 100 is one.

As described above, the resistance value of the resistance element 111 is set to a value at which each IC chip 112 of the predetermined number of casino game media 100 stacked on the antenna 2204 at the game table 2 is not driven by a magnetic field based upon an oscillation signal outputted by the antenna 2203 adjacent to the antenna 2204.

In general, a related-art game table is required to design the reader and writers to be separated from each other to the extent that the casino game medium 100 is not read by the adjacent reader and writer, but according to the above-described configuration, the resistance value can be adjusted later to a resistance value at which the adjacent reading is not performed at the game table 2 that actually uses the casino game medium 100. As a result, the casino game medium 100 does not limit a design of the game table 2, such that a degree of freedom of the design of the game table 2 can be expanded.

While the embodiments of the present invention have been described above, the embodiments merely show specific examples and do not particularly limit the present invention, and a specific configuration of each unit or the like can be appropriately redesigned and modified. An effect described in the embodiments of the present invention merely shows the most desirable effect obtained from the present invention, and an effect of the present invention is not limited to the effect described in the embodiments of the present invention.

For example, in the above-described embodiments, the casino game medium of the present invention is applied to the casino chip as an example, but the present invention is not limited thereto. Specifically, a modification in which the casino game medium is applied to the plaque will be described.

Figure 6:
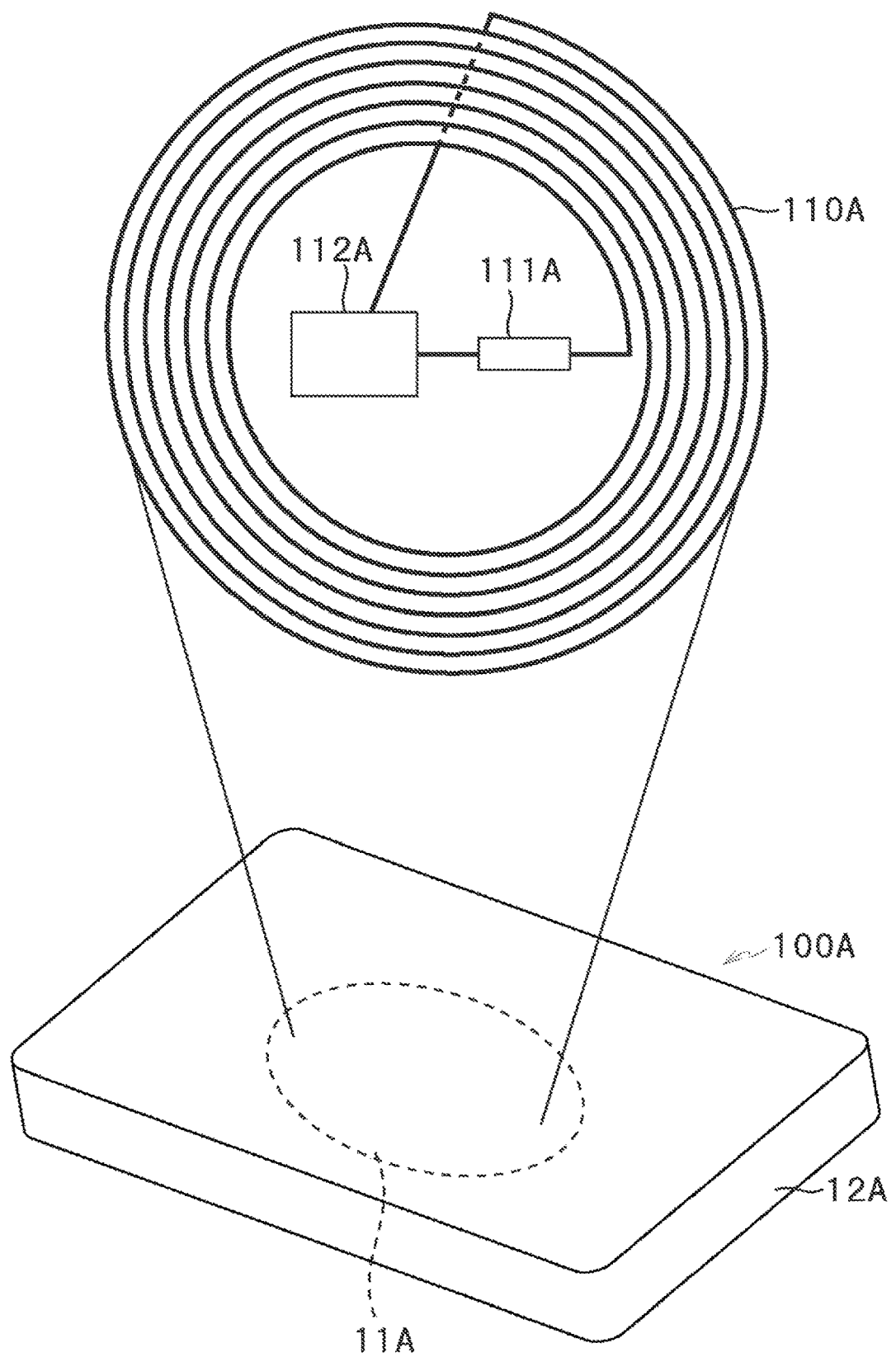
FIG. 6 is an explanatory diagram illustrating a structure of a modification of the casino game medium.

As illustrated in FIG. 6, in the same manner as that of the above-described embodiment, a plaque (casino game medium) 100A includes a PCB 11A and a housing body 12A that houses the PCB 11A inside and forms an outer shape of the casino game medium 100A. The PCB 11A includes a medium side antenna 110A, a resistance element 111A, and an IC chip 112A. The PCB 11A is formed by soldering the resistance element 111A and the IC chip 112A to a PWB on which a wiring pattern of the medium side antenna 110A is applied in advance. The medium side antenna 110A is formed in a spiral pattern, and the resistance element 111A and the IC chip 112A are connected in series between both ends thereof. The casino game medium 100A is formed in a rectangular flat plate shape by insert shaping so that resin is applied around a periphery of the PCB 11A.

The number of turns of the spiral pattern of the medium side antenna 110A is set to be larger than that of the above-described casino chip. Generally, a thickness of the plaque is formed to be the same as that of the casino chip, but since the plaque is formed in the rectangular flat plate shape as described above, an area of a surface on which a game value or the like are shown in an outer surface form is set to be larger than that of the casino chip. Therefore, compared to the casino chip, an area in which the medium side antenna 110A is not provided becomes wider, such that, for example, there is a high possibility that a part of the medium side antenna 110A formed in the spiral pattern is out of a range of the magnetic field from the above-described antenna module 220. Therefore, it is desirable that the number of turns of the spiral pattern of the medium side antenna 110A is set to be larger than that of the casino chip in preparation for a case in which the magnetic field affecting the medium side antenna 110A is smaller than expected.

In the above-described detailed descriptions, a characteristic part is mainly described to more easily understand the present invention. The present invention is not limited to the embodiment described in the detailed descriptions, but can be also applied to other embodiments and the scope of application thereof is varied. The terminology and the phrase used in the present specification are used to accurately describe the present invention, and are not used to limit the interpretation of the present invention. It may be easy for those skilled in the art to reconsider other configurations, systems, methods, or the like included in the concept of the present invention from the concept of the present invention described in the present specification. Therefore, the description of the scope of the claims shall be deemed to include an equivalent configuration without departing from the scope of the technical ideas of the present invention. An object of the abstract is to enable the patent office, a general public institution, and an engineer belonging to the technical field who is not familiar with patents, legal terms, or technical terms to quickly determine the technical content of the present application and nature thereof with a simple investigation. Therefore, the abstract is not intended to limit the scope of the invention to be evaluated by the descriptions of the scope of the claims. In order to fully understand the object of the present invention and the specific effect thereof, it is desirable that the literatures already disclosed are interpreted with due consideration.

PARTS LIST 1 game table system
2 game table
4 dealer display
11 PCB
12 housing body
100 casino game medium
110 medium side antenna
111 resistance element
112 IC chip

What is claimed is:

1. A game table system including a game table that reads medium information stored in an RFID tag casino game medium, wherein
   the RFID tag casino game medium includes:
     a medium side antenna,
     a resistance element connected to the medium side antenna, and
     an IC chip that stores the medium information and outputs the medium information based upon an induced electromotive force generated in the medium side antenna, and
   the game table is provided with a reader and writer that outputs an oscillation signal of a frequency in a specified frequency band below each of a plurality of chip arrangement areas where the casino game medium is disposed, and
   wherein the resistance element and the IC chip are electrically connected to one another and between the medium side antenna,
   wherein a resistance value of the resistance element is set to a value at which each IC chip of the predetermined number of RFID tag casino game media stacked on one reader and writer at the game table is not driven by a magnetic field based upon an oscillation signal outputted by a reader and writer adjacent to the one reader and writer.

2. The game table system according to claim 1, wherein the medium side antenna is designed so that a resonance frequency thereof is higher than the specified frequency band.

3. A method of fabricating an RFID tag casino game media for use in a game table that reads information stored in the RFID tag casino game medium,
   wherein, the RFID tag casino game medium includes:
     a medium side antenna;
     a resistance element; and
     an IC chip that stores medium information and outputs the medium information based upon an induced electromotive force generated in the medium side antenna, and the resistance element and the IC chip are electrically connected to one another and between the medium side antenna; and
   wherein, the game table includes an RFID tag casino game medium reader and writer that outputs an oscillation signal of a frequency in a specified frequency band disposed below each of a plurality of chip arrangement areas, the method comprising:
   selecting a thickness of the RFID tag casino game medium to be read by the reader and writer;
   selecting a desired number of the RFID tag casino game media to be stacked upon one another and within a first chip arrangement area to be read by a first RFID tag casino game medium reader and writer disposed below the first chip arrangement area;
   determining whether the desired number of the RFID tag casino game media game media stacked above the first chip arrangement area can be read by oscillating the first RFID tag casino game medium reader and writer at the specified frequency band;
   where the desired number of the RFID tag casino game media game media stacked above the first chip arrangement area are successfully read, adjusting the medium side antenna to exhibit a resonance frequency higher than the specified frequency band; and,
   adjusting the resistance element such that the desired number of the RFID tag casino game media game media stacked above the first chip arrangement area are successfully read by the first RFID tag casino game medium reader and writer, but not successfully read by a second RFID tag casino game medium reader and writer associated with a second chip arrangement area that is adjacent the first chip arrangement area.

4. The method of claim 3, wherein the resonance frequency of the medium side antenna is higher than 13.56 MHz.

5. The method of claim 3, wherein the medium side antenna is connected in series to the resistance element.

6. The method of claim 3, wherein the medium side antenna is in the form of a spiral pattern forming a coil and the resistance element is disposed outside of an area defined by the spiral pattern.

7. The method of claim 3, wherein the step of adjusting the resistance element comprises increasing the resistance value of the resistance element.

* * * * *